Nov. 15, 1955
T. C. MANN
2,723,598
POWER ACTUATED ROUTER
Filed Dec. 26, 1951
5 Sheets-Sheet 2
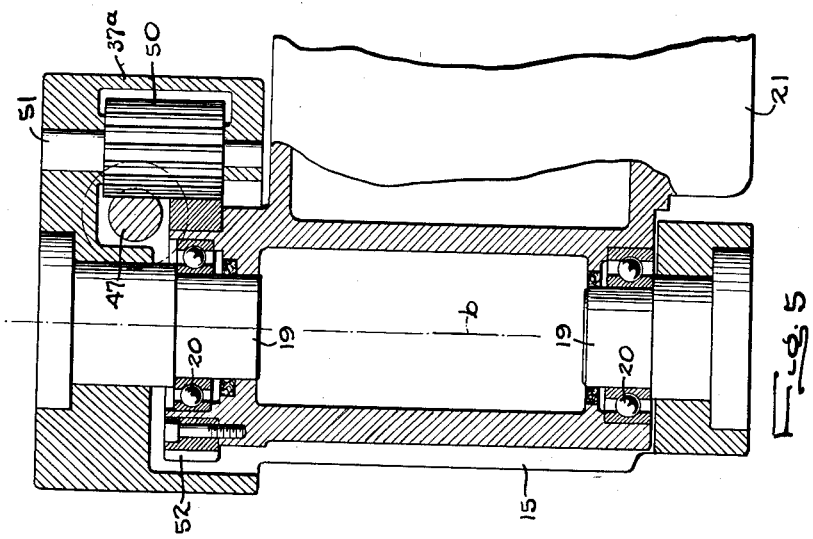
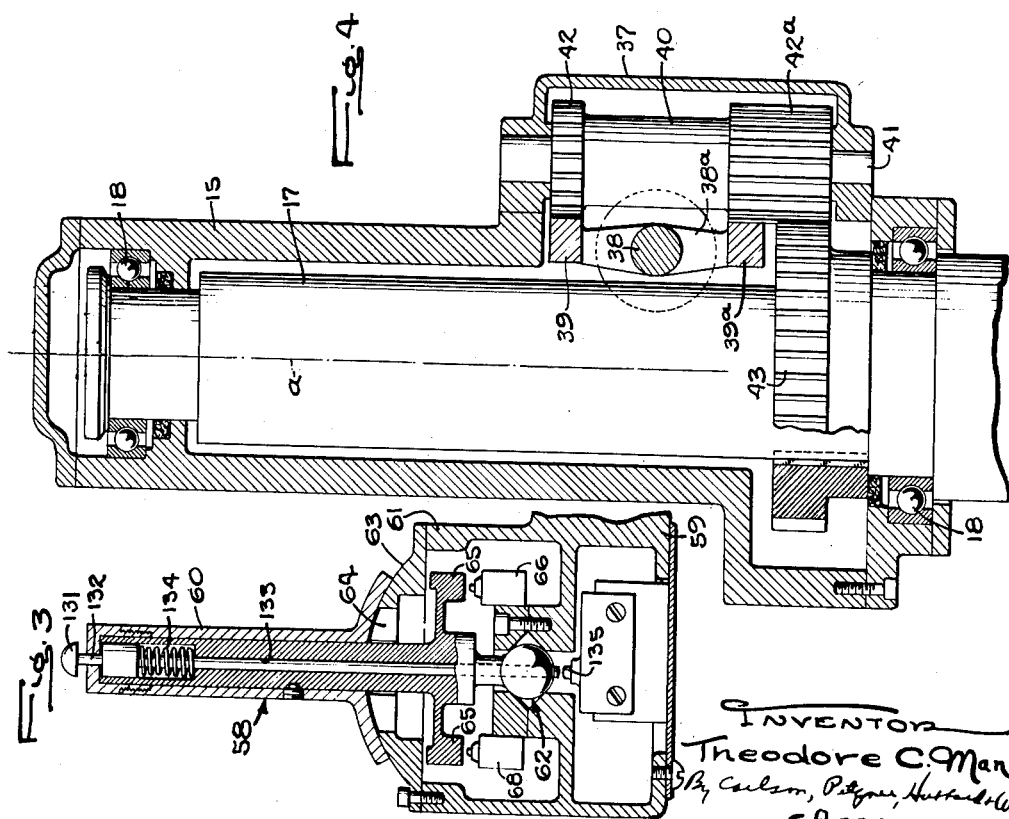
INVENTOR
Theodore C. Mann
By Carlson, Pitzner, Hubbard & Cuff
ATTORNEY

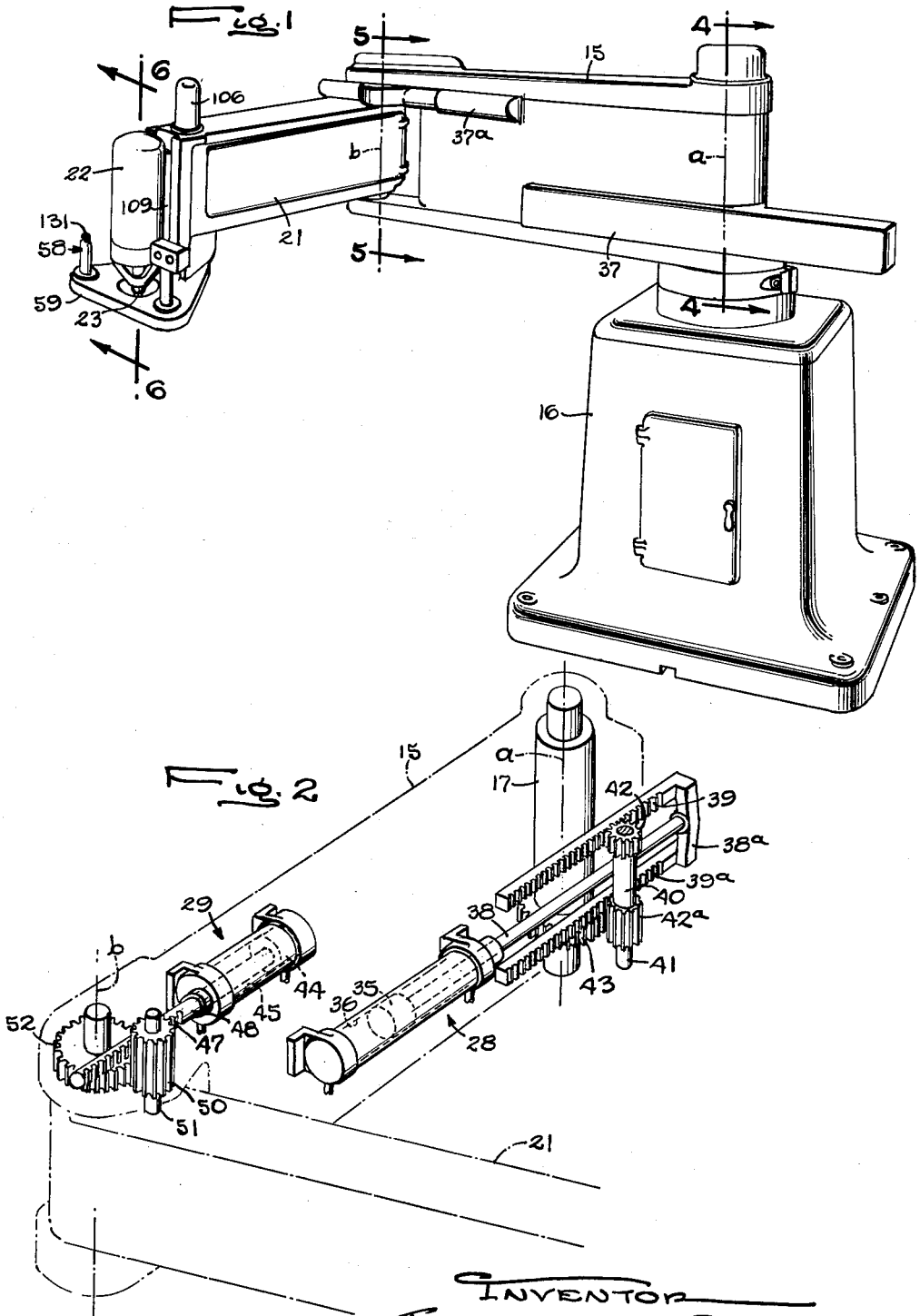

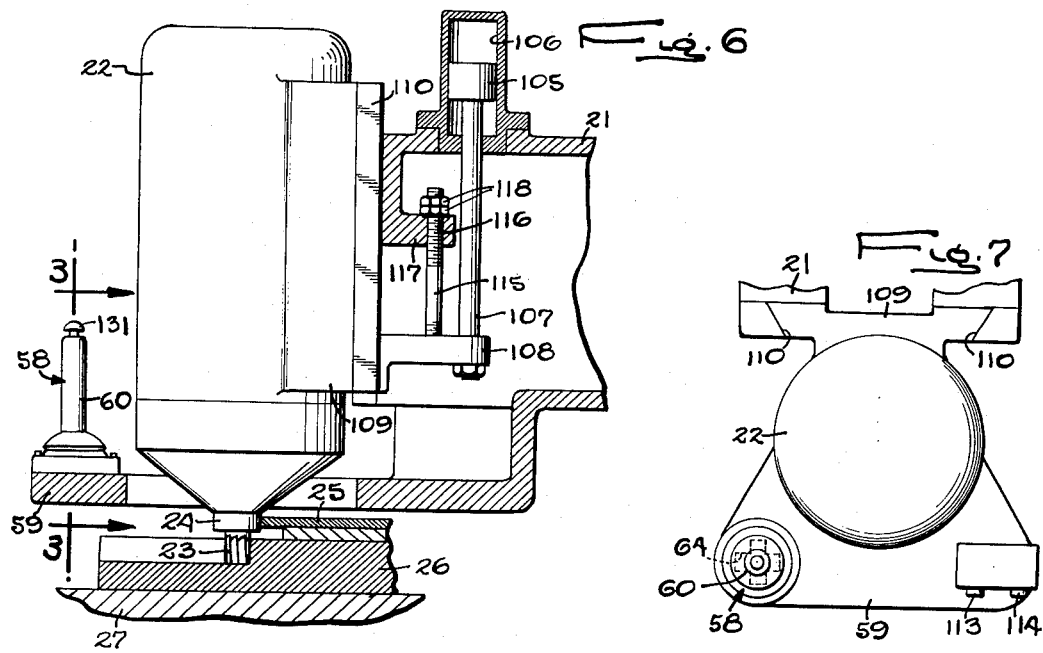
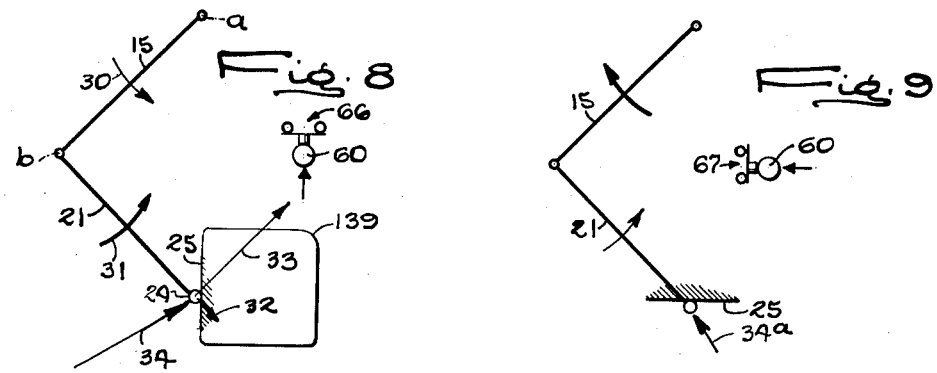
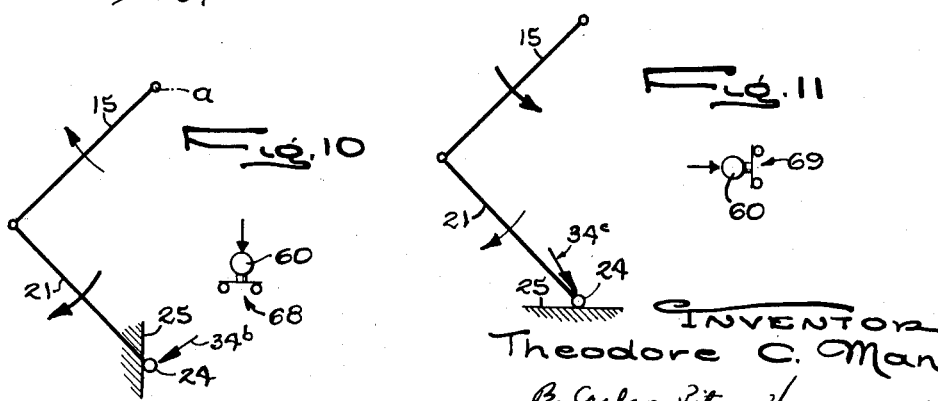

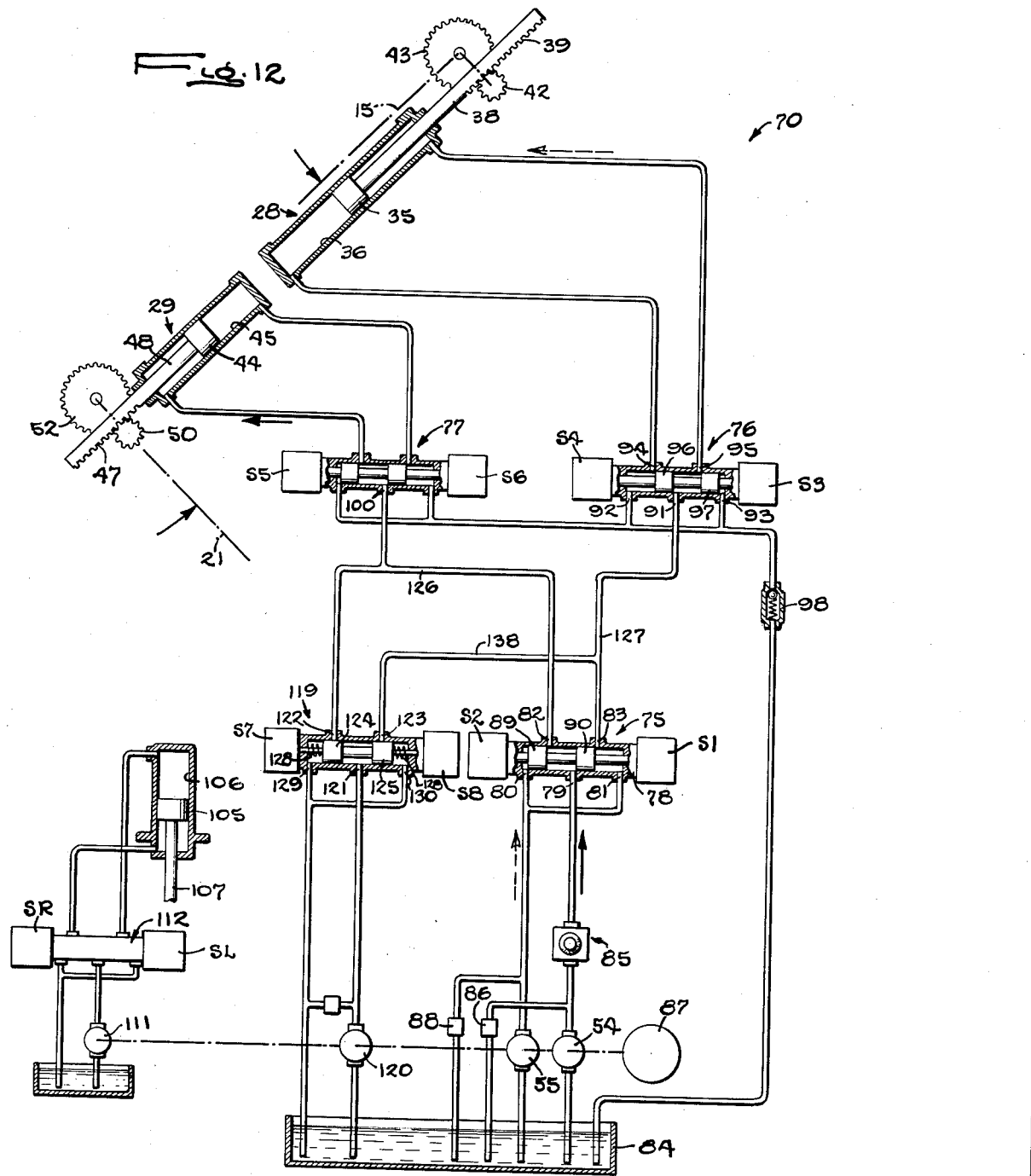

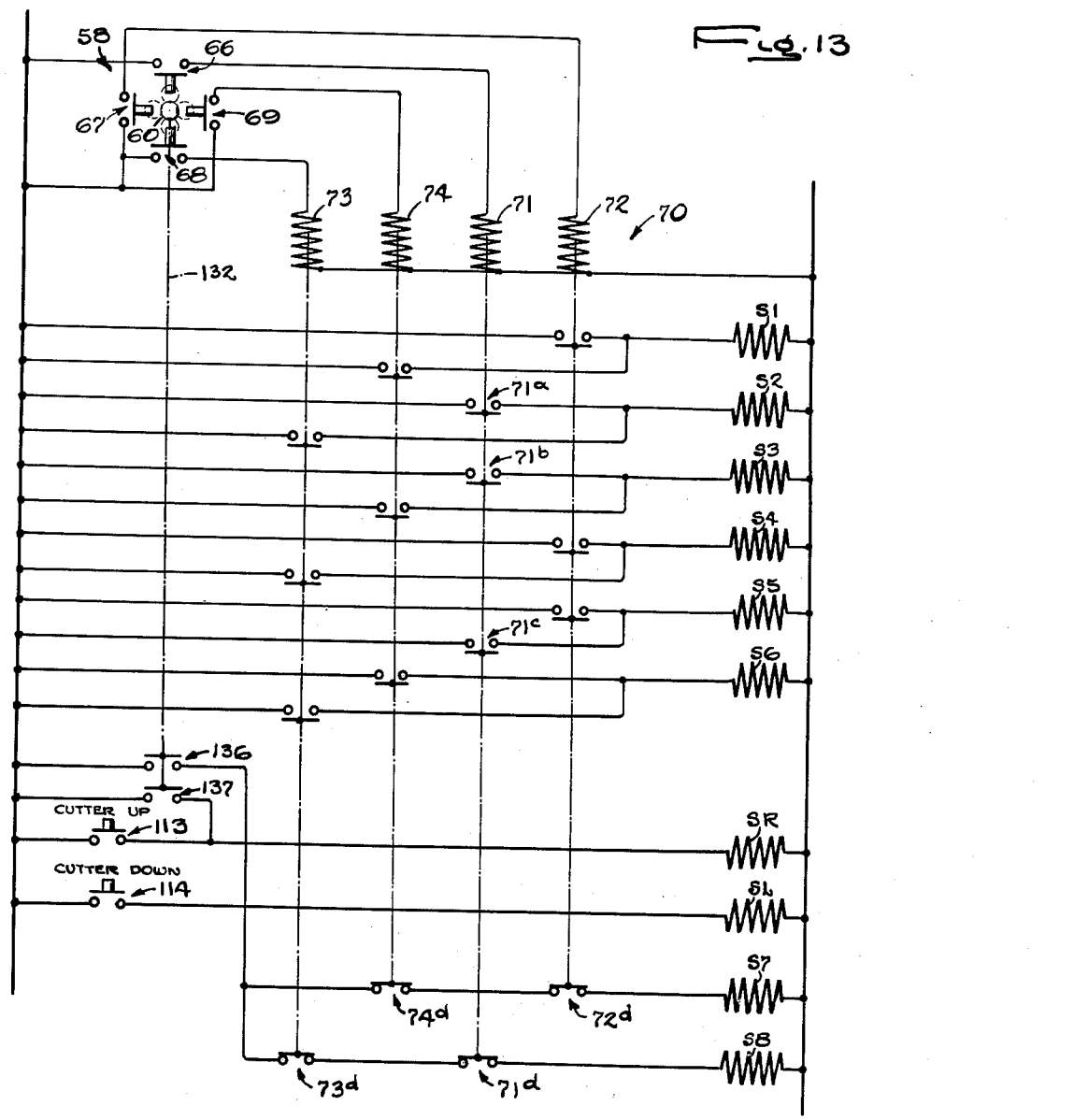

United States Patent Office 2,723,598
Patented Nov. 15, 1955

2,723,598

POWER ACTUATED ROUTER

Theodore C. Mann, Beloit, Wis., assignor to Ekstrom-Carlson & Co., Rockford, Ill., a corporation of Illinois Application December 26, 1951, Serial No. 263,237

20 Claims. (Cl. 90—13.4)

This invention relates to a router for guiding a cutting tool through a workpiece in accordance with the changing contour of a template pattern. More particularly the invention relates to a router in which an arm carrying a cutting tool and a template follower at its outer end is pivoted at its other end on one end of a second or inner arm which is pivotally supported at its other end on a base to swing about a fixed axis, the two pivotal axes usually being disposed vertically.

In using prior constructions of this type, the operator grasps a handle at the free end of the outer arm and pushes or pulls to exert a force one component of which is effective to feed the tool through the work while a smaller component holds the follower against the template, the pivotal mounting of the two arms permitting the tool to be moved freely in any direction in a plane so that it may follow the contour of the template pattern. While it is easy to guide the tool manually through comparatively light work, such hand feeding places fixed limitations on the thickness and kind of work material which may be cut and on the rate of feed through the work.

The primary object of the present invention is to enlarge the range of usefulness of routers of the above type through the use of power actuators to create a resultant force approximating the direction of the manual force exerted by the operator in a hand fed router.

Another object is to derive the desired resultant force from separate force components exerted respectively on the inner and outer arms of the router by individual power actuators.

A further object is to provide for varying the magnitude and direction of the sepaarte force components and thereby enable the direction of the resultant force to be varied widely and throughout a complete circle.

Another object is to derive the forces from torques applied by the power actuators to the arms by arranging one actuator to act between the base and the inner arm and the other actuator to act between the two arms whereby the two actuators swing the inner arm and the outer arm respectively, a selected one of the actuators delivering a high torque to its arm while a low torque is applied to the other arm by its actuator.

A more detailed object is to provide such a router in which the torques are applied by individual piston and cylinder arrangements for each arm and in which high pressure fluid is supplied to a selected cylinder to obtain the high torque while low pressure fluid is supplied to the other cylinder to obtain the low torque.

A further object is to supply the high and low pressure fluids to selected ends of the respective cylinders thereby selectively determining the direction in which the high and low torques are applied to the respective arms.

Still another object is to provide a router of the above type in which the cutter may be traversed rapidly from a position at the end of a cut to the starting position during which movement the cutter is held safely out of engagement with the work.

The invention also resides in the novel construction and mounting of the actuators and in the novel manner in which the power actuators are energized selectively through a plurality of relays and solenoid valves.

Other objects and advantages of the invention will become apparent from the following detailed description taken in connection with the accompanying drawings, in which Figure 1 is a perspective view of a router constructed in accordance with the present invention.

Fig. 2 is a phantom view of the router arms showing the power actuators.

Fig. 3 is a sectional view taken along line 3—3 of Fig. 6.

Figs. 4, 5, and 6 are sectional views taken respectively along lines 4—4, 5—5, and 6—6 of Fig. 1.

Fig. 7 is a plan view of the free end of the tool carrying arm.

Figs. 8, 9, 10, and 11 are diagrammatic views of the arms of the router illustrating the manner in which the forces are applied.

Fig. 12 is a schematic view of the hydraulic system for admitting pressure fluid to the power actuators.

Fig. 13 is a wiring diagram of the control system for the valves of the hydraulic system.

In the drawings, the invention is shown incorporated in a conventional hand fed router construction including an elongated hollow casting forming a horizontal inner arm 15 pivotally mounted at one end on a pedestal or base 16 to swing about an upright axis $a$ defined by a post 17 rigid with and upstanding from the pedestal. As shown in Fig. 4, the mounting includes spaced antifriction bearings 18 the lower one of which rests on a shoulder of the post 17. At its other or outer end, the inner arm is forked and carries alined inwardly projecting shouldered studs 19 (Fig. 5) supporting bearings 20 received in sockets in the upper and lower edges of an outer arm 21 whose inner end projects into the fork. The outer arm is thus adapted to swing freely about the vertical axis $b$ defined by the studs 19 and also is swingable bodily with the inner arm about the axis $a$. Secured to the free end of the outer arm is a motor 22 with a milling cutter or tool 23 (Fig. 6) fast on the vertical shaft thereof and a follower 24 mounted on the motor casing adjacent the tool. As the follower moves along the edge of a template 25 secured to the top of a workpiece 26, the latter being clamped to a suitable table 27, the tool cuts the workpiece to the desired shape.

The present invention contemplates the provision of a pair of reversible power actuators 28 and 29 (Fig. 2), one acting on each of the arms 15 and 21, to swing the arms about their respective axes whereby each arm transmits a separate force to the free end of the outer arm 21 to obtain a resultant force acting in a direction approximating the direction of a force applied manually by an operator using a hand fed router. In order to approximate the desired direction of the resultant force more closely, a selected one of the actuators develops a force greater than that developed by the other actuator so that the resultant acts in a direction more nearly along the line of feed. The actuators 28 and 29 are thereby operable to apply forces of selected magnitude and direction to produce a resultant force which may act in any direction within a 360 degree arc and the resultant thus produced is effective to feed the tool into the work with the arms at any angle to the line of feed so that the tool may cut the workpieces to various sizes and shapes.

In the present instance, the force components are derived from torques exerted tangentially of the respective axes $a$ and $b$. For this purpose the actuator 28 acts between the pedestal or stationary member 16 and the arm member 15 and is mounted on one of the members and connected to the periphery of an arcuate element 43 which is fixed to the other of the members with its center lying along the axis $a$. Thus the force is applied at a distance from the axis *a* and creates a moment tending to swing the arm member 15. Since the moment is effective for this purpose regardless of the particular point on the arcuate element at which the force is applied, the arm member may be constructed to swing about its axis through any desired angle. Similarly, a moment is created to swing the outer arm member 21 by securing the actuator 29 to one of the arm members and arranging the actuator to exert a force tangentially on an arcuate element 52 fast on the other of the arm members and centered about the axis *b*.

To illustrate the manner in which the actuators 28 and 29 produce the desired resultant force, Fig. 8 shows diagramatically the torques and forces, illustrated by the arrows, applied in one of the selective conditions of the actuators. In this condition, the actuator 28 delivers a low counterclockwise torque 30 to the inner arm 15 and the actuator 29 applies a high counterclockwise torque 31 to the outer arm 21, a small force 32 being derived from the low torque and a large force 33 from the high torque. The forces act at the free end of the outer arm in directions perpendicular to the respective arms and the resultant force 34 is directed upwardly and to the right as viewed in Fig. 8 to feed the tool upwardly while holding the follower 24 against the template 25. If the direction in which both actuators are swung is reversed, the resultant acts downwardly and to the left as illustrated in Fig. 10. In a like manner, the resultant force may act in other directions by reversing the direction of only one arm and by applying the high torque to the inner instead of the outer arm (Figs. 9 and 11). Figs. 8 through 11 show four of the eight different combinations which are possible, those illustrated being all that are required for the practical operation of the router since each of them is effective to feed the tool 23 through an arc of 90 degrees and the four may be used successively to move the tool in one direction around a complete circle.

While the actuators 28 and 29 may be in the form of reversible motors of the rotary type, it is preferred to employ reciprocating actuators, such as the piston and cylinder arrangements illustrated in the drawings, lying compactly alongside the inner arm 15. Accordingly, the actuator 28 comprises a double-acting piston 35 (Fig. 2) sliding horizontally in a cylinder 36 mounted within a cover 37 and fast on the inner arm adjacent the pedestal 16. The driven member or piston rod 38 of the actuator 28 supports a pair of toothed racks 39 and 39a respectively above and below the rod and paralleling the latter for horizontal endwise movement, the racks being fastened rigidly together at their outer ends and to the outer end of the piston rod by a bracket 38a. Meshing respectively with the racks 39 and 39a are two pinions 42 and 42a fast on opposite ends of a sleeve 40 and journaled on a vertical shaft 41 (Fig. 4) the ends of which project into and are nonrotatably received in sockets in the upper and lower sides of the cover 37 (see Fig. 4). The lower pinion 42a transmits the force of the actuator 28 and applies it tangentially to the arcuate element 43 which in the form shown is a spur gear keyed to the post 17 and meshing with the pinion. Since the post 17 and the spur gear 43 are stationary on the pedestal 16, the pinion 42a when rotated by sliding of the piston 35 in the cylinder 36 travels around the spur gear with the result that the cylinder 36 and the racks 39 and 39a revolve bodily together about the axis *a*. Thus the actuator 28 acts between the pedestal 16 and the inner arm 15 to swing the latter counterclockwise when the piston moves toward the head end of the cylinder and clockwise when the piston slides in the opposite direction.

Similarly, the actuator 29 for swinging the outer arm 21 comprises a piston 44 and a cylinder 45 bolted to the inner arm 15 alongside the latter, the cylinder 45 being enclosed within a cover 37a (Fig. 5) on the inner arm adjacent the free end thereof. A toothed rack 47 formed on the piston rod 48 meshes with a pinion 50 journaled on a vertical shaft 51 the ends of which are pressed into opposite sides of the cover 37a and are held against rotation. As shown, the arcuate element 52 is in the form of a spur gear bolted to the upper side of the outer arm 21 to rotate about the axis *b* and meshing with the pinion 50 which when rotated by the rack 47 applies the tangential force to the spur gear. As the piston 44 slides in the cylinder 45, the rack 47 rotates the pinion 50 which turns the spur gear 52 and the outer arm 21 bodily therewith. With this construction, the actuator 29 acts between the two arms to swing the outer arm back and forth about the axis *b*. While the actuators 28 and 29 may be designed to swing their respective arms through any desired angle, it is convenient to make the stroke of the piston 35 long enough to turn the inner arm 15 through an angle of 360 degrees and, since the inner arm is in the path of the outer arm, to limit the angle through which the latter may swing to 270 degrees by making the stroke of the piston 44 shorter.

With the above construction, pressure fluid may be admitted to the rod end of the cylinder 36 to turn the inner arm 15 counterclockwise about the axis *a* and the head end to swing the arm clockwise. Similarly, the outer arm swings clockwise and counterclockwise about the axis *b* when pressure fluid is admitted respectively to the head end and the rod end of the cylinder 45. The mounting of the cylinder 45 on the inner arm instead of on the pedestal is advantageous in that the cylinder moves bodily with the two arms as the latter swing together about the axis *a* and the relationship of the piston 44 and the outer arm 21 remains unchanged during this swinging. Thus the actuator 29 is energized only when it is desired to change the angular relationship of the two arms and all of the reciprocating motion of the piston 44 is converted into swinging of the outer arm requiring a shorter cylinder than would be necessary otherwise.

Herein the high and low torques are obtained by admitting fluid from a high pressure source 54 (Fig. 12) to a selected one of the cylinders and fluid from a low pressure source 55 to the other cylinder. By selecting the cylinder to which the high pressure fluid is directed and the ends of the cylinders to which each pressure is admitted, the directions and the magnitudes of the torques may be selected to obtain the desired resultant force.

While it is possible to control the supply of fluid to each of the cylinders 36 and 45 individually, it is desirable to select the various cylinder conditions by selective manipulation of a single control member or selector 58 (Figs. 1 and 6). To this end, the selector, which may conveniently be mounted on a support 59 at the free end of the outer arm 21, is movable to different positions to control the direction in which each of the pistons 35 and 44 slide and the magnitude of the pressure of the fluid admitted to each cylinder. Herein the selector comprises a control handle 60 (Fig. 3) universally mounted in a casing 61 on the support 59 by a ball and socket connection 62 which permits the handle to be rocked toward and away from the operator and to either side. Thus the handle may be shifted into any one of four control positions indicated by dashed lines in Fig. 13. To guide the handle in this movement, a cover 63 for the casing is formed with crossed slots 64 (Fig. 7) through which the handle projects, the handle being at the center of the slots when in the neutral position in which the cylinders 36 and 45 are not connected to the sources of pressure fluid.

Projecting laterally from the handle 60 adjacent the lower end thereof are four switch actuating arms 65, each closing one of four switches 66, 67, 68, and 69 (Fig. 13) in one position of the handle to condition differentially a control mechanism indicated generally at 70 in Figs. 12 and 13. The control mechanism, as conditioned by the selector, directs high pressure fluid to a predetermined end of a selected one of the cylinders 36 and 45 and low pressure fluid to one end of the other cylinders to apply the proper torques to each of the arms 15 and 21 so that the resultant force acts in the desired direction.

The control mechanism 70 is illustrated in Figs. 12 and 13 as comprising four relays 71, 72, 73, and 74 which are energized selectively by the switches 66, 67, 68, and 69 in accordance with the position of the selector 58 and which, in turn, energize different combinations of solenoids S1, S2, S3, S4, S5, and S6. The latter actuate multiple valves 75, 76, and 77 to control the flow of high and low pressure fluids to the cylinders 36 and 45. When the selector is moved to close the switch 66, for example, the relay 71 closes switches 71a, 71b, and 71c to energize solenoids S2, S3, and S5.

The valve 75 communicates with the pressure fluid sources 54 and 55 and functions to direct the high pressure fluid to a selected one of the cylinders 36 and 45 and the low pressure fluid to the other cylinder. The valve 76 is interposed between the valve 75 and the cylinder 36 and selectively directs the pressure fluid from the valve 75 to either the head end or the rod end of the cylinder 36. Similarly, the valve 77 serves to determine to which end of the cylinder 45 the pressure fluid supplied to that cylinder is admitted. With this arrangement, the magnitude of the pressure in each cylinder and the direction in which each cylinder acts may be selected to apply the desired torques to the arms 15 and 21.

The valve 75 comprises a valve body 78 having a high pressure inlet 79, two low pressure inlets 80 and 81 and two pressure outlets 82 and 83. Herein the high pressure source 54 is a pump driven by a motor 87 and delivering fluid from a sump 84 to a conventional volume controller 85, the fluid being at a predetermined high pressure established by a pressure regulator 86 on the outlet side of the pump. The volume controller 85 supplies a metered quantity of high pressure fluid to the inlet 79 of the valve 75. As shown, the low pressure source 55 is also a pump driven by the motor 87. The pump 55 delivers fluid from the sump 84 to the valve inlets 80 and 81 at a low pressure set by a pressure regulator 88.

Sliding in the valve body 78 are two valve members 89 and 90 rigidly connected to each other and to the armatures of the solenoids S1 and S2 to control the inlets and the outlets. When the solenoid S2 is energized, the valve members are in the position shown in Fig. 12 with the high pressure inlet 79 communicating with the outlet 82, the low pressure inlet 81 connected to the outlet 83, and the other low pressure inlet 80 closed by the valve member 89. If the solenoid S1 is energized, the solenoid S2 will be deenergized, since only one solenoid can actuate the valve 75 at a time, and the valve members 89 and 90 will move to the right of the valve body 78 as viewed in Fig. 12. In this new position, the high pressure inlet 79 now is connected to the outlet 83, the low pressure inlet 80 communicates with the outlet 82 and the low pressure inlet 81 is closed by the valve member 90.

The valves 76 and 77 are identical to the valve 75 in construction, but, since the purpose of these valves is to direct the incoming fluid pressure, whether it be high or low, selectively to the head end or the rod end of the cylinders 36 and 45, the flow arrangement through them is different. The port 91 of the valve 76, for example, is an inlet for the pressure supply while the ports 92 and 93 are discharge outlets and the ports 94 and 95 communicate with the head end and rod end respectively of the cylinder 36. Thus with the solenoid S3 energized, valve members 96 and 97 are positioned as shown and the pressure supply enters the valve 76 through the inlet port 91 and communicates with the rod end of the cylinder 36 through the port 95. At the same time, the fluid in the head end of the cylinder 36 is discharged through the ports 94 and 92 and back to the sump 84 through a pressure relief valve 98 while the port 93 is closed by the valve member 97. If the solenoid S4 is energized, the valve members 96 and 97 slide to the left and the pressure supply is now to the head end of the cylinder 36 and the discharge from the rod end is through the ports 95 and 93. The valve 77 functions in the same manner as the valve 76 to regulate the pressure supply and fluid discharge of the cylinder 45.

Power actuated means is provided for raising and lowering the tool 23 between an active cutting position and an elevated position above the work so that the tool may be moved to any desired position before being lowered into cutting engagement with the work. Herein this means comprises a piston 105 sliding vertically in a cylinder 106 (Figs. 6 and 12) and connected through a rod 107 and a horizontal bracket 108 to a head 109 carrying the motor 22 and the tool 23. The head slides vertically in ways 110 formed in the outer end of the arm 21 and is raised and lowered as the piston 105 moves in its cylinder 106. To slide the piston, a third pump 111, also driven by the motor 87, delivers fluid to either end of the cylinder 106 through a valve 112. The end of the cylinder 106 to which the fluid is admitted is determined by selectively actuating the valve 112 through a set of solenoids SL and SR. Thus if the solenoid SR is energized by depressing a push button 113 (Fig. 13) the valve 112 is actuated to admit fluid to the rod end of the piston 105 which will slide upwardly in the cylinder and thereby raise the head 109 and the tool 23 away from the workpiece 26. Similarly, the head and the piston will be lowered when the solenoid SL is energized by depressing another push button 114. To limit the downward movement of the head, thus regulating the depth to which the tool cuts, a stud 115 upstanding from the horizontal member 108 slides through an opening 116 in a bracket 117 which is rigid with the arm 21. The stud 115 is threaded to receive stop nuts 118 which, together with the bracket 117, serve to limit the downward motion of the bracket and the head.

The present invention further contemplates rapidly traversing the tool 23 from any position in which one cut is completed to the point at which a new cut is to be begun and, as an incident to this rapid movement, automatically raising the tool and holding it in the raised position so that neither the tool nor the workpiece will be damaged. Preferably the selector 58 is utilized to determine the direction of the rapid movement in the same manner that it is used to select the direction in which the tool is fed into the work, the tool moving away from the operator, for example, when the handle 60 is rocked in that direction. For this purpose, the high pressure cylinder, as selected by the position of the handle 60, is employed to move the tool in the desired direction and is supplied with an additional quantity of high pressure fluid from a pump 120 (Fig. 12) to supplement the fluid delivered by the pump 54. With the additional fluid being supplied to the selected cylinder, the piston moves faster thus swinging its associated arm quickly and effecting the rapid traverse of the tool. The pump 120 delivers fluid to a valve 119 which normally is closed but, when a rapid traverse push button 131 (Figs. 1 and 3) is depressed, the valve 119 is actuated in synchronism with the valve 75 as the handle 60 is moved to its various control positions and directs the supplemental fluid to the same cylinder as does the valve 75.

The high pressure fluid delivered by the pump 120 enters the valve 119 through an inlet 121 and leaves through one of the outlets 122 and 123 as determined by the positions of the valve members 124 and 125. The outlet 122 is connected above the valve 75 to a fluid line 126 leading to the pressure inlet 100 of the valve 77 and the outlet 123 is similarly connected by a conduit 138 to a line 127 leading to the inlet 91 of the valve 76. Thus the outlet 122 communicates with the cylinder 45 through the valve 77 and the outlet 123 is connected to the cylinder 36 through the valve 76.

To open one or the other of the outlets 122 and 123 thereby to place the pump 120 in communication with one of the cylinders 36 and 45, the valve members are shifted to the left or right by solenoids S7 and S8 respectively while a pair of compression springs 128 serve to center the valve members to close both outlets. When one of the solenoids S7 and S8 is energized to place the inlet 121 in communication with one of the outlets 122 and 123, the other outlet is connected to the sump 84 through one of a pair of discharge outlets 129 and 130 formed in the valve.

The energization of the solenoids S7 and S8 is controlled by the push button 131 which is disposed on the upper end of a rod 132 slidably mounted within a bore 133 formed axially along the center of the control handle 60 (Fig. 3). The rod is normally urged by a spring 134 toward an upper position, as shown in Fig. 3, and, when the push button is depressed, the lower end of the rod engages a control button 135 to close a pair of switches 136 and 137 (Fig. 13), the switch 136 being in the circuit of both of the solenoids S7 and S8 and the switch 137 being in the circuit of the solenoid SR. In addition, the relays 71 and 73 include respectively normally closed switches 71$^d$ and 73$^d$ in the circuit of the solenoid S8 and the relays 72 and 74 include similar switches 72$^d$ and 74$^d$ in the circuit of the solenoid S7.

When the push button 131 is depressed, the switch 137 is closed and the solenoid SR is energized to raise the head 109 and hence the tool 23 away from the workpiece 26. At the same time, the switch 136 is closed completing the circuits of the solenoids S7 and S8 but, when the handle 60 is rocked to close either of the switches 66 and 68, one of the relay switches 71$^d$ and 73$^d$ is opened and only the solenoid S7 is energized opening the outlet 122 of the valve 119 to supply the supplemental fluid to the valve 77, the latter being actuated in accordance with the position of the handle 60 and determining to which end of the cylinder 45 the fluid from both of the valves 75 and 119 is supplied. Similarly, one of the relay switches 72$^d$ and 74$^d$ is opened when either of the switches 67 and 69 is closed and the solenoid S8 is energized alone to open the outlet 123 and to direct the fluid from the valve 119 to the cylinder 36 through the valve 76.

During the rapid tranverse of the tool 23, the low pressure fluid supplied by the pump 55 is by-passed to the sump 84 through the valve 119. When the pumps 54 and 120 are in communication with the cylinder 45, for example, the low pressure fluid flows from the valve 75 to the sump through a fluid line 138 and the ports 123 and 130 of the valve 119. With this arrangement, only the high pressure cylinder is effective when the tool is traversed rapidly.

Operation

Assuming that the workpiece 26 is to be cut according to the pattern of the template 25 shown in Fig. 8, the cut is begun at the lower left hand corner of the template as viewed in the drawing and the handle 60 is rocked away from the operator to close the switch 66. With the latter closed, the actuator 28 applies a low counterclockwise torque 30 to the inner arm 15 and the actuator 29 delivers a high counterclockwise torque 31 to the outer arm 21 to obtain a resultant force 34 acting upwardly and to the right. The resultant holds the follower 24 against the right side of the template 25 and feeds the tool upwardly into the work. When the upper left hand corner of the template is reached, the operator shifts the handle 60 to the right to close the switch 69 and to obtain the resultant 34$^c$ shown in Fig. 11 and the follower 24 moves to the right along the top of the template. At a point 139 on the curved upper right hand corner of the template, the condition shown in Fig. 11 is ineffective to hold the follower against the template and the handle is shifted toward the operator to close the switch 68. The resultant 34$^b$ (Fig. 10) then acts downwardly and to the left to move the follower down along the left side of the template. The resultant 34$^a$ (Fig. 9) obtained by closing the switch 67 is effective to feed the tool to the left with the follower held against the bottom of the template.

If the next cut is to be started at the top of the workpiece 26, the operator depresses the rapid traverse push button 131 thereby raising the tool 23 away from the workpiece. Then, with the push button 131 still depressed, the handle 60 is rocked away from the operator to close the switch 66 and to actuate the valves 75, 77, and 119 so that the high pressure fluids delivered by the pumps 54 and 120 are admitted to the rod end of the cylinder 45. Since the combined capacity of the two pumps is relatively large, the outer arm 21 is swung rapidly in a counterclockwise direction moving the tool away from the operator.

It will be apparent that, throughout the entire operation, the tool 23 is power driven through the workpiece 26 around the template 25 thus permitting the router to be used for cutting thick metal and other heavy work. By the application of two forces, one through each of the arms 15 and 21, a resultant force is produced to feed the tool into the work and to hold the follower against the template. At the same time, the direction in which the resultant force acts may be determined by selecting the arm to which the high torque is transmitted and the directions in which both the high and the low torques are applied. Thus the path of the tool may be varied to correspond to the contour of the template outline. In addition, since the head 109 is withdrawn automatically from the workpiece when the rapid traverse push button 131 is depressed, there is never any danger that the tool will cut the work accidentally as the arms swing the tool to its starting position.

I claim as my invention:

1. A power actuated router for guiding a cutting tool through a workpiece in accordance with the contour of a template comprising, in combination, a first arm pivoted at one end to swing about a fixed axis, a first fluid pressure actuator having a driven member coupled to said first arm to apply a torque thereto tending to swing said arm about said axis, a second arm pivoted at one end on the other end of said first arm to swing about an axis parallel to said first axis and adapted to carry at its other end the cutting tool and a template follower, a second fluid pressure actuator having a driven member coupled to said second arm to apply a torque thereto tending to swing said second arm about its axis, means to supply one of said actuators with high pressure fluid and the other of said actuators with low pressure fluid, a second source of high pressure fluid, a valve communicating with said second source and operable when actuated to direct fluid from said second source to the actuator receiving said high pressure fluid, means to actuate said valve, and mechanism operable as an incident to the actuation of said valve to move and hold said tool away from said workpiece.

2. A router for guiding a cutting tool through a workpiece in accordance with the contour of a template comprising, in combination, a first arm pivoted at one end to swing about a fixed axis, a second arm pivoted at one end on the free end of said first arm to swing about an axis parallel to said first axis and adapted to carry at its other end the cutting tool and a template follower, a first fluid pressure actuator having a driven member coupled to said first arm to apply a torque thereto tending to swing said arm about said axis, a second fluid pressure actuator having a driven member coupled to said second arm to apply a torque thereto tending to swing said second arm about its axis, means to supply one of said actuators with high pressure fluid and the other of said actuators with low pressure fluid, a supplemental source of high pressure fluid, a valve communicating with said supplemental source and operable when actuated to direct fluid from said supplemental source to the actuator receiving said high pressure fluid, and means to actuate said valve.

3. A router having, in combination, a base, an arm pivoted on said base to swing about an upright axis, a tool supporting arm pivoted on the free end of said first arm to swing about an axis parallel to said first axis, a power operator acting between said base and said first arm to swing the latter, a second power operator acting between said two arms and operable to swing said second arm relative to said first arm, a member movable to a plurality of different positions, mechanism responsive selectively to movement of said member and operable in the respective positions to energize one of said operators to one degree, means responsive to the movement of said member and operable when activated to energize said one operator to a higher degree thereby to swing the associated arm at a faster rate, an element manually movable between two positions, and a connection between said element and said means and operable in one position of said element to activate said means.

4. A router for guiding a cutting tool through a workpiece in accordance with the pattern of a template comprising, in combination, a first arm pivoted at one end to swing about a fixed axis, a first power actuator having a piston and a cylinder with a driven member coupled to said arm to apply a torque thereto tending to swing said arm back and forth about its axis, a second arm pivoted at one end on the other end of said first arm to swing about an axis parallel to said first axis and adapted to carry at its other end the cutting tool and a template follower, a second power actuator having a piston and a cylinder with a driven member coupled to said second arm to apply a torque thereto tending to swing said second arm back and forth about its axis, a manually operable selector movable to a plurality of positions, a plurality of electrical relays, one for each position of said selector and each activated by said selector in one of said positions, a source of high pressure fluid, a source of low pressure fluid, and a plurality of solenoid valves energized in different combinations by said relays to connect a selected end of the cylinder of a selected one of said actuators with said high pressure source to transmit a high torque to the associated arm in a direction corresponding to the position of said selector and connect a selected end of the cylinder of the other of said actuators with said low pressure source to transmit a low torque to its associated arm in a direction according to the position of said selector.

5. A router having, in combination, a base, an arm pivoted on said base to swing about an upright axis, a tool supporting arm pivoted on the free end of said first arm to swing about an axis parallel to said first axis, a reversible power actuator comprising a piston and a cylinder and acting between said base and said first arm to swing the latter selectively in one direction or the other, a second reversible power actuator comprising a piston and a cylinder and acting between said two arms to swing said second arm back and forth relative to the first arm, a valve having a fluid inlet and selectively directing fluid flowing therethrough to the ends of the cylinder of said first actuator, a second valve similar to the first valve and controlling the flow of fluid to the ends of the cylinder of said second actuator, a source of high pressure fluid, a source of low pressure fluid, a third valve communicating with said sources and operable selectively to direct high pressure fluid to the inlet of one of said first and second valves and low pressure fluid to the inlet of the other of said valves, and means for actuating all of said valves in selected combinations to control the magnitude of the fluid pressure in each cylinder and the end of each cylinder to which pressure fluid is admitted.

6. A router for cutting a workpiece in accordance with the pattern of a template comprising, a first arm pivoted at one end to swing about a fixed axis, a second arm pivoted at one end on the other end of said first arm to swing about an axis parallel to said first axis and adapted to carry at its other end a cutting tool and a template follower, a power actuator having a piston and a cylinder with a driven member coupled to said first arm to apply a torque thereto tending to swing said arm back and forth about its axis, a second power actuator having a piston and a cylinder with a driven member coupled to said second arm to apply a torque thereto tending to swing said second arm back and forth about its axis, a manually operable selector movable to a plurality of positions, a source of high pressure fluid, a source of low pressure fluid, and a valve mechanism conditioned differentially by said selector in said positions and operable to connect a selected end of the cylinder of a selected one of said actuators with said high pressure source to transmit a high torque to the associated arm in a direction corresponding to the position of said selector, said valve mechanism including means operable to connect a selected end of the cylinder of the other of said actuators with said low pressure source to transmit a low torque to its associated arm in a direction according to the selector position.

7. A power actuated router for guiding a cutting tool through a workpiece in accordance with the pattern of a template comprising, in combination, a firm arm pivoted at one end to swing about a fixed axis, a first reversible power actuator having a driven member coupled to said arm to apply a torque thereto tending to swing said arm back and forth about its axis, a second arm pivoted at one end on the other end of said first arm to swing about an axis parallel to said first axis and adapted to carry at its other end the cutting tool and a template follower, a second reversible actuator having a driven member coupled to said second arm to apply a torque thereto tending to swing said second arm back and forth about its axis, a manually operable selector movable to a plurality of positions, and a control mechanism conditioned differentially by said selector in said positions and operable to energize a selected one of said actuators to transmit a high torque to the associated arm in a direction determined by the position of said selector, said control mechanism including means operable to energize the other of said actuators to transmit a low torque to its associated arm in a direction corresponding to the position of said selector.

8. A router having, in combination, a stationary supporting member, an inner arm member pivoted at one end on said supporting member to swing about a predetermined axis, an arcuate element centered about said axis and fixed to one of said members, a power actuator rigid with the other of said members and operable to apply a force tangentially to said arcuate element thereby to swing said inner arm member, an outer arm member pivotally connected at one end to the other end of said inner arm member to swing about a second axis parallel to said first mentioned axis, a power rotated spindle and a template follower mounted on said outer arm and disposed along a common axis parallel to said first and second axes, a second arcuate element centered about said second axis and fastened to one of said arm members, and a second power actuator mounted on the other of said arm members and operable to apply a tangential force to said second arcuate element thereby to swing said second arm.

9. A power actuated router for guiding a cutting tool through a workpiece in accordance with the pattern of a template comprising, in combination, an inner arm pivoted at one end to swing about a fixed axis, an outer arm pivoted at one end on the other end of said inner arm to swing about an axis parallel to said first axis and adapted to carry at its other end the cutting tool and a template follower, a first power actuator having a driven member coupled to said inner arm to apply a torque thereto tending to swing said arm about its axis, a second power actuator mounted on said inner arm and having a driven member coupled to said outer arm to apply a torque thereto tending to swing said outer arm about its axis, and a control mechanism selectively operable to energize one of said actuators to transmit a high torque to its associated arm and to energize the other of said actuators to transmit a low torque to the other of said arms.

10. A power operated router having, in combination, first and second arms pivotally connected together at adjacent ends to swing about a predetermined axis, a base pivotally supporting the opposite end of said first arm for swinging both of the arms bodily together about a second axis parallel to said first axis, a tool and follower mounted on the outer end of said second arm and disposed along a common axis parallel to said first and second axes, a first power actuator comprising a cylinder rigid with and lying longitudinally along said first arm adjacent said second axis and a piston sliding in said cylinder, means providing a driving connection between said piston and said base and operable in response to sliding of the piston to swing said first arm about said second axis, a second power actuator comprising a cylinder secured to said first arm adjacent said first axis and a piston sliding in the cylinder longitudinally of the first arm, and means connecting the piston of said second actuator to the second arm to swing the latter about said first axis.

11. A router having, in combination, a base, an arm pivoted on said base to swing about an upright axis, a tool supporting arm pivoted on the free end of said first arm to swing about an axis parallel to said first axis, a rotatable spindle and a template follower mounted on said tool supporting arm and centered about a common axis parallel to said two axes, a reciprocating power actuator mounted on and lying alongside said first arm adjacent said base, means to convert the reciprocating motion of said actuator into swinging of said first arm, a second reciprocating power actuator mounted on and lying alongside one of said arms adjacent the pivotal axis of said second arm, and means acting between said arms and operable in response to the movement of said second actuator to swing said second arm about its axis.

12. A router having, in combination, a base, an arm pivoted on said base to swing about an upright axis, a tool supporting arm pivoted on the free end of said first arm to swing about an axis parallel to said first axis, a rotatable spindle and a template follower mounted on said tool supporting arm and centered about a common axis parallel to said two axes, a reversible power operator acting between said base and said first arm to swing the latter selectively in one direction or the other, a second reversible power operator acting between said two arms and operable selectively to swing said second arm relative to the first arm in one direction or the other, a member manually movable into a plurality of different positions, and mechanism responsive to the movements of said member and operable in two of said positions to energize one of said operators to one degree and the other operator to a lesser degree but in opposite directions respectively.

13. A router having, in combination, a base, an arm pivoted on said base to swing about an upright axis, a tool supporting arm pivoted on the free end of said first arm to swing about an axis parallel to said first axis, a rotatable spindle and a template follower mounted on said tool supporting arm and centered about a common axis parallel to said two axes, a reversible power operator acting between said base and said first arm to swing the latter selectively in one direction or the other, a second reversible power operator acting between said two arms and operable selectively to swing said second arm relative to the first arm in one direction or the other, a member manually movable to a plurality of different positions, and mechanism responsive selectively to movement of said member and operable in the respective positions to energize a predetermined one of said operators to one degree and the other of said operators to a different degree.

14. A power actuated double arm router comprising, a stationary support, an inner arm pivoted at one end on said support to swing about a fixed axis, an outer arm pivoted at one end on the outer free end of said inner arm to swing relative thereto about an axis paralleling said first axis and adapted to carry at its outer free end a cutting tool and a template follower, a reversible power actuator acting between said support and said inner arm and adapted when energized to exert a force tending to swing said inner arm relative to said support about said fixed axis, a second and separate reversible power actuator acting between said inner and outer arms and adapted when energized to swing the outer arm relative to the inner arm about said second axis, four control devices each individually movable independently of the positions of said arms between active and inactive positions, and mechanism controlled selectively by each of said devices and governing the direction and degree of energization of said two actuators to produce different resultant forces for holding said follower against a template and feeding said cutter and said follower along the template.

15. In a power actuated double arm router, the combination of, an inner arm pivoted at one end to swing about a fixed axis, a reversible power actuator mounted on said inner arm and having a driven member coupled to said arm to exert a force tending to swing the arm about said axis, an outer arm pivoted at one end on the outer free end of said inner arm to swing relative thereto about an axis parallel to said first axis, a second and separate power actuator mounted on said inner arm and having a driven member coupled to said outer arm to exert a force tending to swing the outer arm about said second axis when said second actuator is energized, a power rotated cutter and a template follower mounted on the outer free end of said outer arm and disposed on a common axis paralleling said first and second axes, and selectively controllable means for effecting energization of said actuators simultaneously to produce a resultant force acting on said follower to cause the latter to follow around the changing peripheral contour of a template.

16. A double arm router comprising, a stationary support, an inner arm pivoted at one end on said support to swing about a fixed axis, an outer arm pivoted at one end on the outer free end of said inner arm to swing relative thereto about an axis paralleling said first axis, a power rotated cutter spindle and a template follower mounted on the outer free end of said outer arm and disposed on a common axis paralleling said first and second axes, a reversible power actuator acting between said support and said inner arm and adapted when energized to exert a force tending to swing said inner arm relative to said support about said first axis, a second and separate reversible power actuator mounted on one of said arms adjacent said second axis and acting between said inner and outer arms to swing the outer arm relative to the inner arm about said second axis, and selectively controllable means for effecting energization of said actuators simultaneously to produce a resultant force having one component acting on said follower to hold the same against a template and a second component acting on said spindle and said follower to feed the two along the template.

17. A double arm router having, in combination, a stationary supporting member, an inner arm member pivoted at one end on said stationary member to swing about a fixed axis, a reversible power actuator mounted on one of said members and acting between the two members to exert a force tending to swing said inner arm member about said axis, an outer arm member pivoted at one end on the outer free end of said inner arm member to swing relative thereto about an axis parallel to said first axis, a second and separate reversible power actuator mounted on one of said arm members and acting between the two arm members to exert a force tending to swing the outer arm member relative to the inner arm member about said second axis, a power rotated cutter and a template follower mounted on the outer free end of said outer arm member and disposed on a common axis paralleling said first and second axes, and selectively controllable means for effecting energization of said actuators simultaneously to produce a resultant force acting on said follower to cause the latter to follow around the changing peripheral contour of a template.

18. A double arm router comprising, a stationary support, an inner arm pivoted at one end on said support to swing about a fixed axis, an outer arm pivoted at one end on the outer free end of said inner arm to swing relative thereto about an axis paralleling said first axis, a power rotated cutter and a template follower mounted on the outer free end of said outer arm and disposed on a common axis paralleling said first and second axes, a reversible power actuator acting between said support and said inner arm and adapted when energized to exert a force tending to swing said inner arm relative to said support about said fixed axis, a second and separate reversible power actuator acting between said inner and outer arms and adapted when energized to swing the outer arm relative to the inner arm about said second axis, and selectively controllable means for effecting energization of said actuators simultaneously to produce a resultant force having one component acting on said follower to hold the same against a template and a second component acting on said cutter and said follower to feed the two along the template.

19. A double arm router having, in combination, a stationary support, an inner arm pivotally connected at one end on said support to swing about a first predetermined axis, a first reversible power actuator having a driven member connected to said arm to exert a force tending to swing the arm about said axis, an outer arm pivotally connected at one end to the outer free end of said inner arm to swing relative thereto about a second and parallel axis, a second and separate reversible power actuator having a driven member connected to said outer arm to exert a force tending to swing the outer arm about said second axis, a power rotated spindle and a template follower mounted on the outer free end of said outer arm for bodily movement therewith and disposed on a common axis paralleling said first and second axes, a selector element having a neutral position and manually movable radially away from said position, a plurality of control devices spaced around said element and disposed at the same predetermined angle relative to each other and to the element in all positions of said arms, said elements being actuated selectively by said element upon movement away from said position, and control mechanism responsive to the actuation of said control devices and operable to energize said actuators differentially in accordance with the actuation of the control devices thereby to cause said actuators to exert forces of different magnitudes.

20. A double arm router comprising a stationary support, an inner arm pivoted at one end on said support to swing about a fixed axis, an outer arm pivoted at one end on the outer free end of said inner arm to swing relative thereto about a second axis paralleling said fixed axis, a power rotated cutter and a template follower mounted on the outer free end of said outer arm and disposed on a common axis which parallels said first and second axes and is fixed relative to said outer arm, a first reversible power actuator acting between said support and said inner arm and operable when energized to exert a force tending to swing said inner arm relative to said support about said fixed axis, a second and separate reversible power actuator acting between said inner and outer arms and operable when energized to swing the outer arm relative to the inner arm about said second axis, a manually movable control member mounted for movement relative to said cutter and follower in a plurality of different directions extending transversely of said common axis, a first control mechanism selectively operable to energize said first actuator and cause said inner arm to swing back and forth about said fixed axis, a second control mechanism selectively operable to energize said second actuator and cause said outer arm to swing back and forth about said second axis, and means coupling said member and said control mechanisms to activate the latter selectively and cause said actuators to produce a resultant force acting transversely of said common axis and thereby urge said cutter and follower in a direction correlated with the direction of movement of said member.

References Cited in the file of this patent

UNITED STATES PATENTS

| 2,046,563 | Kirby et al. | July 7, 1936 |
| 2,069,189 | Taylor | Jan. 26, 1937 |
| 2,339,001 | Clay et al. | Jan. 11, 1944 |
| 2,456,730 | Patton | Dec. 21, 1948 |
| 2,486,097 | Barnes | Oct. 25, 1949 |

FOREIGN PATENTS

| 523,743 | Great Britain | July 22, 1940 |